May 25, 1943. W. P. ERICKS 2,320,225
CONDENSATION PRODUCTS OF AMIDINES WITH ALKYLENE OXIDES
Filed Jan. 30, 1941
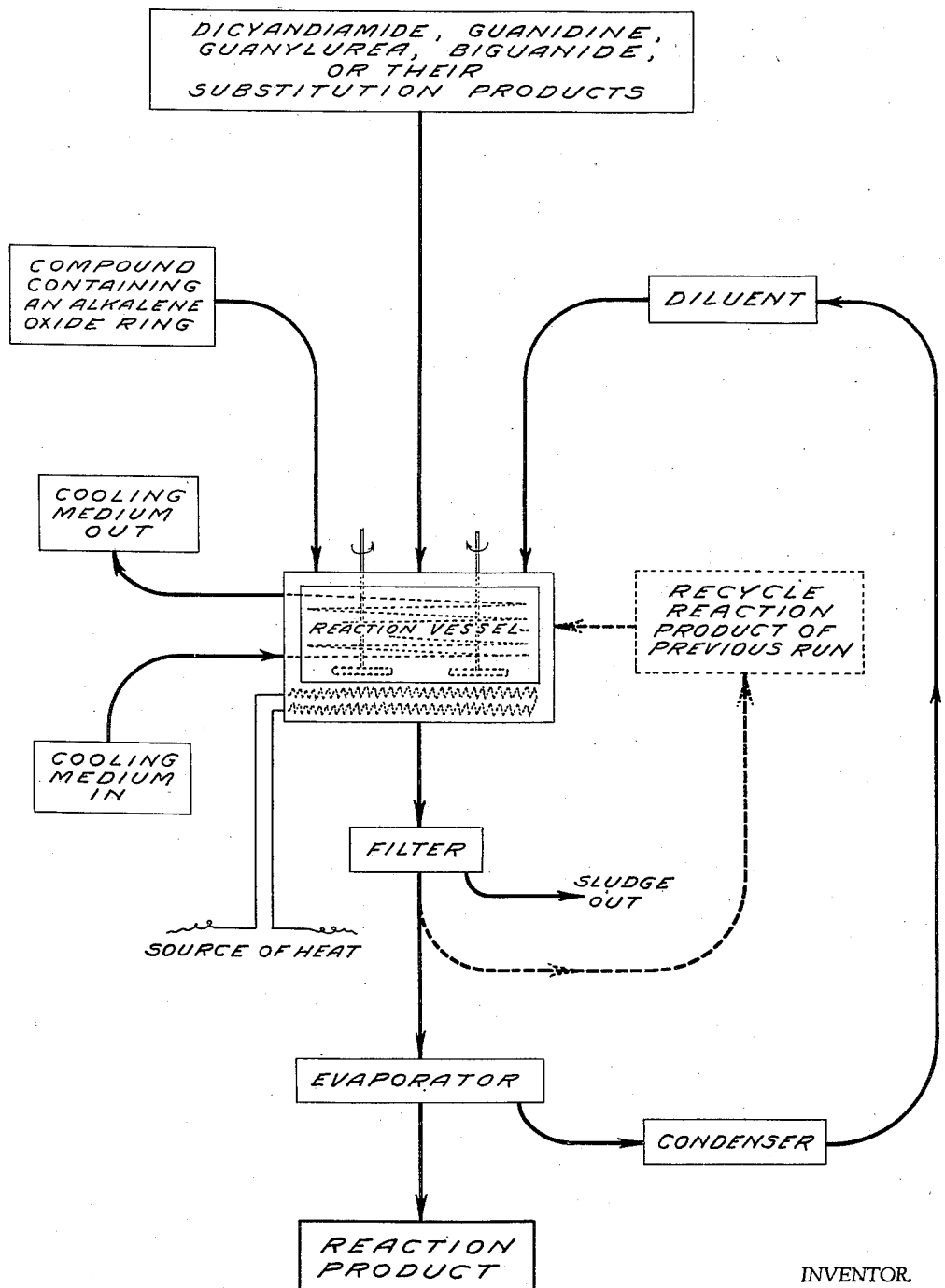
INVENTOR.
WALTER P. ERICKS,
BY
ATTORNEY.

Patented May 25, 1943

2,320,225

UNITED STATES PATENT OFFICE 2,320,225

CONDENSATION PRODUCTS OF AMIDINES WITH ALKYLENE OXIDES

Walter P. Ericks, Coscob, Conn., assignor to American Cyanamid Company, New York, N. Y., a corporation of Maine Application January 30, 1941, Serial No. 376,618

2 Claims. (Cl. 260—564)

This invention relates to the preparation of new and useful condensation products of amidines and substituted amidines with alkylene oxides.

More particularly, it embraces the preparation of condensation products by reacting amidines such as dicyandiamide, guanidine, guanylurea and biguanide with alkylene oxides such as ethylene oxide, glycidol or compounds capable of yielding an intermediate containing an alkylene oxide ring during the condensation reaction.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents as well as for the resolution of emulsions such as petroleum-water emulsions. They also find use as mercerizing assistants. Further and more important uses are suggested in the following description.

With these objects in view and such others as may hereinafter appear, the invention consists in the novel products and processes described below and more particularly defined in the claims.

The accompanying flow sheet represents the process diagrammatically. As shown the necessary reactants are mixed together with a diluent or as alternatively shown in broken lines with a portion of a recycled liquid reaction product. The product is then obtained by evaporation of the diluent as shown.

The compounds of this invention are prepared in general by reacting an amidine, substituted or unsubstituted, with a compound containing an ethylene oxide ring. If desired the reaction is accelerated by using a temperature of 150 to 200° C. and a suitable organic or inorganic base, preferably an alkali-metal or alkaline earth metal hydroxide such as sodium hydroxide, potassium hydroxide, calcium hydroxide, or pyridine and the like. Usually the reaction is exothermic and hence must be controlled as by the use of an efficient cooling device. The reaction product can be purified by filtration, evaporation, and if necessary further purified by solvent extraction. Usually the reaction is exothermic and hence must be controlled as by the use of an efficient cooling device. In place of a compound containing an alkylene oxide ring, an epihalogenhydrine may be used, or a similar substance having a radical which under the conditions of the reaction forms an intermediate having an alkylene oxide ring.

The following examples illustrate the invention in more detail:

Example I 22.4 g. of dicyandiamide (0.266 mol.), 50 cc. of water and 35.2 g. of ethylene oxide were reacted in a steel bomb by heating under pressure to 106° C. over a time interval of 40 minutes. An exothermic reaction then set in increasing the temperature rapidly to 128° C. which was maintained for about 25 minutes. The reaction bomb was cooled, the reaction mixture placed in a shallow dish and evaporated over night in an air drying oven at 50° C. The resultant product was a pale yellow, viscous liquid, readily soluble in water and weighing 55.4 g., containing 97.5% of the desired product, or equivalent to 93.6% of the theoretical yield. It had highly desirable anti-oxidant properties for use in soaps and fatty glycerides and could be used as an intermediate in the preparation of surface-active materials.

Example II 22.3 g. of propylene oxide, 20.2 g. of dicyandiamide and 30 g. of water were heated rapidly to 115° C. in a steel bomb and were then reacted at 115–120° C. for 3 hours. After evaporation, a pale yellow, viscous resin was obtained which was easily soluble in hot water.

Example III 8.4 g. of dicyandiamide (0.1 mol.) and 14.8 g. of glycidol (0.2 mol.) were stirred and heated in a beaker to 115° C. At this temperature most of the dicyandiamide was in solution. The mixture was further heated to 120° C. whereupon a vigorous exothermic reaction occurred, necessitating the placing of the beaker in an ice bath. On cooling, a pale yellow, hard resin was obtained which was readily soluble in hot water but only sparingly soluble in alcohol.

Example IV 180 g. of guanidine carbonate (1.0 mol.) was stirred in 500 cc. of water at room temperature and 102 g. of concentrated sulfuric acid (1 mol.)

diluted with 200 cc. of water was added slowly. To this solution was added a slurry of 111 g. of calcium hydroxide (1.5 mol.) in 200 cc. of water. The resultant slurry was cooled to 2° C. and ethylene oxide was added slowly. During the addition of ethylene oxide an exothermic reaction took place but the temperature was held at 5° to 10° C. by cooling the flask with an ice bath. After stirring for two hours at 10° C. the solution was allowed to warm slowly while the ice was melting in the ice bath.

The reaction was allowed to proceed to completion with constant stirring for several hours, whereupon the mixture was filtered and oxalic acid added to the filtrate until no more calcium oxalate formed. The remaining sulfates were precipitated with barium hydroxide and the combined precipitates removed by filtration. The filtrate was evaporated on a shallow dish in an air-drying oven at 65° C. to yield a colorless, viscous liquid weighing 202 g.

Example V 19.55 g. of 1,3-didodecyl guanidine (0.05 mol.), 6.3 g. of ethylene oxide (0.15 mol.) and 40 g. of dioxane as solvent were charged into a steel bomb previously cooled to 0° C. Constant stirring and heating of the reactants to 70° C. over a period of 35 minutes caused a pressure rise to 30 pounds per square inch. The temperature was maintained at 70° C. for 3 hours during which interval the pressure gradually decreased to normal. Cooling the bomb and evaporating the dioxane from the reaction mixture with the aid of a steam bath yielded the product, which was probably 1,3-didodecyl-2-diethoxyethylol guanidine, as a brown colored wax which was easily dispersible in water and possessed excellent surface-active properties.

Example VI 3.04 g. of 1-xylyl-3-dodecyl guanidine (0.01 mol.) and 2.9 g. of glycidol (0.04 mol.) were heated in a beaker to 85° C. with constant stirring. The heating was then discontinued and after stirring a few minutes longer, an exothermic reaction occurred, causing the temperature to rise to 115° C. The product was a viscous resin readily soluble in cold water, foaming upon shaking and possessing excellent surface-active properties.

Example VII 12.0 g. of 1,3-di-o-tolyl guanidine and 14.8 g. of glycidol were stirred and heated to 150° C. in a beaker on a hot plate. At this temperature an exothermic reaction occurred and the temperature was held at 150 to 160° C. for 15 minutes by cooling the reacting mixture on a water bath. Further cooling yielded the product as a pale yellow, pliable, transparent resin which was insoluble in cold water and only sparingly soluble in hot water.

Example VIII

Monoethylol guanidine was prepared as follows:

23.4 g. of guanidine carbonate was acidified with dilute sulfuric acid. The sulfates were precipitated out by the addition of sufficient barium hydroxide and filtered off. The filtrate containing free guanidine was cooled to 5° C. with ice and .04 g. of sodium hydroxide was dissolved therein. 9.5 g. of ethylene oxide were added slowly with constant stirring and the temperature maintained at 5–10° C. After stirring for 12 hours at 10° C. the solution was evaporated to yield 12.4 g. of monoethylol guanidine, as a viscous resinous product.

Example IX

Ethylol guanylurea was prepared as follows:

33.8 g. of guanylurea sulfate dissolved in water at 28° C. was mixed with 11.2 g. of calcium hydroxide slurried in 50 cc. of water. This mixture was constantly stirred for 3 hours at about 10° C. with 8.8 g. of ethylene oxide. It was then reacted for an additional 3 hours, stirred and evaporated under reduced pressure. The reaction product was extracted several times with ethyl alcohol and the extracts evaporated to yield the desired product.

Example X 13.25 g. of biguanide sulfate, 8.3 g. of sodium hydroxide and 26.3 g. of sodium carbonate were reacted in 100 cc. of water. The solution was cooled with 150 g. of ice to about 5–10° C. and then reacted with 2.7 g. of ethylene oxide introduced slowly and with constant stirring until a clear solution resulted. This solution was neutralized with hydrochloric acid, evaporated and the reaction product was purified by repeated extraction with ethyl alcohol and the extracts evaporated. The product was a pale yellow, viscous liquid.

Example XI

A hexa- and octa-decyl (mixed) substituted biguanide containing an ethylol group was prepared by the following method:

22.4 g. of dicyandiamide, 35.2 g. of ethylene oxide and 50 cc. of water were heated under pressure to 106° C. An exothermic reaction caused the temperature to reach 128° C. After evaporation of the excess water by heating the reaction product at 65° C. under reduced pressure 55.4 g. of a faintly yellow, viscous liquid, easily soluble in water and ethyl alcohol was obtained.

28.6 g. of the reaction product obtained as above described in Example I and 81.0 g. of hexa- and octa-decyl (mixed) amine hydrochloride were reacted by heating and constant stirring at 145° C., for 30 minutes and then cooled. The product, having the probable formula 1-diethoxyethylol-5-hexa- and octa-decyl (mixed) biguanide hydrochloride, was a light tan wax which was readily dispersible in water and soluble in ethyl alcohol. It served as an excellent softening agent for cotton, rayon and other cellulosic fibers and fabrics and had highly desirable emulsifying and detergent properties in acid solutions. It was also effective in resolving and breaking petroleum-water emulsions. The presence in this substituted biguanide of an alkoxy and/or hydroxy group increases its solubility markedly in water and polar solvents.

In addition to ethylene oxide and glycidol, various other ethylene oxide ring compounds may be used, namely propylene oxide, isobutylene oxide, tetramethyl-ethylene oxide, n-hexyl-ethylene oxide as well as ethylene chlorohydrin, epichlorhydrin, chloroglycerol, their substitution products, and other compounds having a reactive ethylene oxide ring present or which are capable of forming an ethylene oxide ring in the course of the reaction. However, if the compound chosen for the reaction with an amidine has a low boiling point, i. e. ethylene oxide, propylene oxide, and the like, it is advantageous to carry out the reaction in a closed system and under elevated pressure in order to avoid the loss of the reactants at the temperature at which the reaction takes place at a sufficiently rapid rate to make the process commercially feasible.

These condensation products obtained by reacting a compound containing an ethylene oxide ring and an unsubstituted amidine are of particular utility in the preparation of surface-active agents of the cation-active type. By substitution with alkyl, aryl, and aralkyl groups, the unsubstituted alkylol amidines above described acquire excellent surface active properties. For this reason they are well suited for wetting and softening wool, cotton, cellulose acetate, cellulose nitrate, viscose and similar materials. They are also useful in the emulsification of mineral oils, glycerides, fats, oils and the like. These compounds, more particularly the alkylol amidines, are useful anti-oxidants for oils and soaps, functioning as stabilizers in that they prevent rancidity and deterioration of liquid and solid soaps when incorporated therein. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries. In the reaction described in Example VI, particularly when polyamines are used instead of a monoamine, or when temperatures are not carefully regulated, mixtures result containing several different products. When used as textile assistants or in leather and similar processing industries it is not necessary to isolate the individual compounds; instead, the mixtures can be used directly.

The products described herein may be further reacted with an amine, either primary or secondary, or with a fatty acid to yield highly desirable and useful surface-active compounds.

In addition to the amidines above mentioned, various others may be condensed with the alkylene oxides. Among such compounds may be specifically cited substituted dicyandiamides such as ethyl dicyandiamide, phenyl dicyandiamide, p-tolyl and m-tolyl dicyandiamide, p-chlorophenyl dicyandiamide, p-bromophenyl dicyandiamide, 4-phenyl, 4-methyl dicyandiamide, and the like. Among the guanidines the following may be reacted to form condensation products: the carbaminyl guanidines, diphenyl carbaminyl guanidine, 1-butyl guanidine, 1,1'-diamyl guanidine, ethylene diguanidine, 1(2-pyridyl) guanidine and the acid salts, among others such as 1-octadecyl guanidine, the mono-, di-, and tri-dodecyl guanidines, and the like. Further examples of substituted guanylureas include such as 1-methyl guanylurea, 3-methyl guanylurea, 4-methyl guanylurea, 4-phenyl guanylurea, 4-methyl-phenyl guanylureas, guanyl thiourea, 4-methyl guanyl thiourea, 4-ethyl guanyl thiourea, 4-phenyl guanyl thiourea, 4-isobutyl guanyl thiourea, 4-allyl guanyl thiourea, 4-isoamyl guanyl thiourea, 4-phenylethyl guanyl thiourea, p-methoxyphenyl guanyl thiourea, p-ethoxyphenyl guanyl thiourea, and the like, each may be reacted and condensed with an alkylene oxide to give products having such desirable properties as those above described. Such substituted biguanides as the following may be similarly reacted with alkylene oxides: piperyl biguanide, mono-alkyl substituted biguanides such as 1-ethyl biguanide, 1-methyl biguanide, or 1-dodecyl biguanide, 1-methyl, 1-phenyl biguanide, o-tolyl biguanide, and the like.

It is to be understood that the examples given above are merely specific embodiments and that the invention is not limited thereto, but is to be broadly construed within the scope of the appended claims.

I claim:

1. The condensation product of dicyandiamide with ethylene oxide obtained by their reaction at a temperature of substantially 106° C. in a sealed pressure bomb.

2. The process for the preparation of condensation products which comprises reacting dicyandiamide with ethylene oxide at a temperature of substantially 106° C. in a sealed pressure bomb.

WALTER P. ERICKS.